(12) United States Patent
Kaag

(10) Patent No.: US 10,224,739 B2
(45) Date of Patent: Mar. 5, 2019

(54) SOLAR POWERED AND BATTERY OPERATED SYSTEMS AND METHODS FOR CONTROLLING THE SAME

(71) Applicant: KONINKLIJKE PHILIPS N.V., Eindhoven (NL)

(72) Inventor: Bjorn Christiaan Wouter Kaag, Heerlen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 331 days.

(21) Appl. No.: 14/905,860

(22) PCT Filed: Jul. 22, 2014

(86) PCT No.: PCT/EP2014/065695
§ 371 (c)(1),
(2) Date: Jan. 18, 2016

(87) PCT Pub. No.: WO2015/011127
PCT Pub. Date: Jan. 29, 2015

(65) Prior Publication Data
US 2016/0156220 A1 Jun. 2, 2016

(30) Foreign Application Priority Data
Jul. 23, 2013 (EP) ................................... 13177517

(51) Int. Cl.
*H02J 1/10* (2006.01)
*H02J 3/06* (2006.01)
(Continued)

(52) U.S. Cl.
CPC ............. *H02J 7/35* (2013.01); *H01M 10/441* (2013.01); *H01M 10/465* (2013.01);
(Continued)

(58) Field of Classification Search
CPC .... H02J 7/35; H02J 7/0022; H02J 2007/0067; H05B 37/02; H02S 40/38; H01M 10/465; H01M 10/441
USPC .......................................................... 307/20
See application file for complete search history.

(56) References Cited

U.S. PATENT DOCUMENTS 5,886,499 A   3/1999 Hall
2010/0035664 A1  2/2010 Liu
(Continued)

FOREIGN PATENT DOCUMENTS

EP   2362479 A1   8/2011
EP   2463981 A1   6/2012
(Continued)

OTHER PUBLICATIONS

Srinivasan, V. et al., "This Week in Batteries (TWiB), battery Rules", Feb. 28, 2010, XP055212081 http://thisweekinbatteries.blogspot.nl/2010/02/battery-rules.html.

*Primary Examiner* — Richard Tan
(74) *Attorney, Agent, or Firm* — Larry Liberchuk

(57) ABSTRACT

A power supply system has a solar cell and a battery which comprises a plurality of modules. The number of modules used to supply electrical power to the load is controlled as well as the recharging of the modules, based on energy supply and demand data over a time period of multiple days. This enables the battery modules to be used more efficiently, and they can be charged and recharged less frequently on average, thereby extending the battery lifetime.

17 Claims, 12 Drawing Sheets

(51) Int. Cl.
    *H02J 3/46*       (2006.01)
    *H02J 7/35*       (2006.01)
    *H01M 10/44*      (2006.01)
    *H01M 10/46*      (2006.01)
    *H02J 7/00*       (2006.01)
    *H02S 40/38*      (2014.01)
    *H05B 37/02*      (2006.01)

(52) U.S. Cl.
    CPC ............ *H02J 7/0022* (2013.01); *H02S 40/38* (2014.12); *H05B 37/02* (2013.01); *H02J 2007/0067* (2013.01)

(56) References Cited

U.S. PATENT DOCUMENTS

| | | |
|---|---|---|
| 2011/0204852 A1 | 8/2011 | Saruhashi |
| 2011/0266993 A1 | 11/2011 | Vaish |
| 2012/0176094 A1* | 7/2012 | Okuda ............... H01M 10/441 320/134 |
| 2012/0187920 A1 | 7/2012 | Zhong |
| 2012/0212183 A1* | 8/2012 | Yamada ................. H02J 3/32 320/126 |
| 2013/0175975 A1 | 7/2013 | Shinozaki |
| 2013/0245850 A1* | 9/2013 | Okayama ................ G06F 1/26 700/295 |

FOREIGN PATENT DOCUMENTS

| WO | WO2011095922 A2 | 8/2011 |
| WO | WO2014170800 A1 | 10/2012 |
| WO | WO2014170800 A1 | 10/2014 |

\* cited by examiner

| rings | max W | days/month | jan 31 | feb 28 | mrt 31 | apr 30 | may 31 | jun 30 | jul 31 | aug 31 | sep 30 | oct 31 | nov 30 | dec 31 |
|---|---|---|---|---|---|---|---|---|---|---|---|---|---|---|
| | | rings used (#) | | | | | | | | | | | | |
| 3 | 25 | | 3 | 3 | 3 | 2 | 2 | 2 | 2 | 2 | 3 | 3 | 3 | 3 |
| 4 | 30 | | 4 | 4 | 3 | 3 | 2 | 2 | 2 | 3 | 3 | 4 | 4 | 4 |
| 5 | 40 | | 5 | 5 | 4 | 3 | 3 | 3 | 3 | 3 | 4 | 5 | 5 | 5 |
| 6 | 40 | | 6 | 6 | 5 | 4 | 3 | 3 | 3 | 4 | 4 | 5 | 5 | 6 |
| 7 | 50 | | 7 | 6 | 5 | 4 | 3 | 3 | 3 | 4 | 5 | 6 | 6 | 7 |
| 8 | 60 | | 8 | 7 | 6 | 5 | 4 | 4 | 4 | 5 | 6 | 7 | 8 | 8 |
| 9 | 70 | | 9 | 8 | 7 | 5 | 5 | 4 | 5 | 5 | 7 | 8 | 9 | 9 |
| 10 | 75 | | 10 | 9 | 8 | 7 | 5 | 5 | 5 | 6 | 8 | 9 | 10 | 10 |
| 11 | 80 | | 11 | 10 | 8 | 6 | 5 | 5 | 5 | 6 | 7 | 9 | 10 | 11 |

FIG. 9

| | jan | feb | mr. | apr | may | jun | jul | aug | sep | oct | nov | dec |
|---|---|---|---|---|---|---|---|---|---|---|---|---|
| days/month | 31 | 28 | 31 | 30 | 31 | 30 | 31 | 31 | 30 | 31 | 30 | 31 |
| resultant cycles | | | | | | | | | | | | |
| rings max W | | | | | | | | | | | | |
| 3 | 25 | 31 | 28 | 31 | 20 | 21 | 20 | 21 | 21 | 30 | 31 | 30 | 31 |
| 4 | 30 | 31 | 28 | 23 | 23 | 16 | 15 | 15 | 23 | 23 | 31 | 30 | 31 |
| 5 | 40 | 31 | 28 | 25 | 18 | 19 | 18 | 19 | 19 | 24 | 31 | 30 | 31 |
| 6 | 40 | 31 | 28 | 26 | 20 | 16 | 15 | 15 | 21 | 20 | 26 | 30 | 31 |
| 7 | 50 | 31 | 24 | 22 | 17 | 13 | 13 | 13 | 18 | 17 | 27 | 26 | 31 |
| 8 | 60 | 31 | 25 | 23 | 19 | 16 | 15 | 15 | 19 | 23 | 27 | 30 | 31 |
| 9 | 70 | 31 | 25 | 24 | 17 | 17 | 13 | 17 | 17 | 23 | 28 | 30 | 31 |
| 10 | 75 | 31 | 25 | 25 | 21 | 18 | 15 | 15 | 19 | 24 | 28 | 30 | 31 |
| 11 | 80 | 31 | 25 | 23 | 19 | 14 | 14 | 14 | 17 | 19 | 25 | 27 | 31 |

FIG. 10

SOLAR POWERED AND BATTERY OPERATED SYSTEMS AND METHODS FOR CONTROLLING THE SAME

FIELD OF THE INVENTION

This invention relates to solar powered products, and in particular to products incorporating a battery for charge storage and a solar panel for generating current to recharge the battery.

BACKGROUND OF THE INVENTION

The invention is of particular interest for products which have a varying demand over time from the solar panel and the battery. An example is solar powered lighting, such as off grid street lighting.

Battery lifetime is considered a main differentiator for solar powered lighting products. Present solar powered lights use batteries to store the energy for use in the night. The present choice of battery technology is a lead (Pb) battery because of cost. Present Pb batteries have a relatively short life of 2 to 3 years. This is mainly caused by the use in a solar application. If a Pb battery is recharged immediately after discharge, and with the correct charging profile, it may enjoy a lifespan of up to 5 years. However, the solar application does not always produce enough current for a complete recharge, especially in the winter when the Pb battery is run in a partially charged condition (a so-called partial "State Of Charge"). The result is that the Pb battery has a shorter lifespan of typically 2 to 3 years, which may not be deemed sufficient.

Theoretically, lithium battery technology does have much longer life, with claims of 10 years under optimal conditions. However, also for Li-Ion batteries the outdoor solar charging conditions limit the lifespan, this time caused by the temperatures under operation. In addition, the battery is cycled (i.e. charged and discharged) every night.

In solar powered energy applications, seasonal effects cause the energy supply and demand to not be in balance. This means that batteries are fully used in winter and only partly used in summer.

The particular issues relating to outdoor solar applications will now be discussed using off grid solar powered (street) lighting technology as an example, and this will be referred to as "OSL".

The current technology of grid-connected outdoor lighting has high installation cost, largely due to the high grid installation cost and pole installation cost. There are also high maintenance costs. For example cable repair can be required when tree roots penetrate cables.

Some of the problems of the grid connected outdoor lighting system as described above are solved by a solar powered, battery driven system, but current technology is not optimal for a number of reasons.

In warm conditions, almost all battery technologies suffer increased degradation. The mitigation is to over dimension the battery for the expected End Of Life capacity, but that costs additional money. A better way is to avoid that the battery can become too hot when charging with high(er) current. Because batteries have a limited life, they need to be replaced, and the old battery disposed of. Most battery technologies contain materials which cannot be left in the environment, such as lead or electrolytes. If non lead-based batteries are used, the need to bury them into the ground can be avoided to eliminate expensive ground works. In addition, a battery technology with longer life will reduce these costs. To reach performance requirements over the designed lifetime, batteries must be derated (operated below their maximum output), which drives up cost, volume and weight.

The depth of discharge, i.e. the depth to which charge is removed from the battery as a percentage of the full charge state, is directly related to the expected lifetime of the battery. The battery life versus Depth Of Discharge is often shown in a graphs from a IEC-896-2 cycle test. When a typical lead battery is discharged completely, the corresponding life is around 300 cycles. To achieve 600 cycles, no more than 60% of full charge may be used. For example: to reach 5 years of operational life with a charge/discharge every night, 1825 cycles are required, which is only achievable if that typical lead battery is discharged no more than 20%. This means that to reach a lifespan of 5 years requires 5 times over dimensioning based on typical Pb battery technology as used in street lighting. In fact, 5 years is not generally achieved using Pb batteries under typical outdoor, solar charging conditions.

The invention aims to enable an increase in lifespan of a battery used in a solar application, by making positive use of the need for different battery usage at different times. A battery pack for an outdoor, solar charged street lighting application is typically dimensioned for the shortest day in winter. In addition, backup capacity may be installed to provide power during several days of bad weather. The resultant energy storage requirement is often only implemented with multiple batteries (modules) put together in a series and/or parallel way.

SUMMARY OF THE INVENTION

The invention is defined by the claims. The dependent claims define advantageous embodiments.

According to the invention, there is provided a controller for controlling a power supply system.

The invention thus provides a controller which enables the battery life of a battery used within a solar system to be extended. The expected energy demand and supply is determined at a particular moment in time for example based on seasonal and weather patterns. Based on this information, a number of battery modules needed to sustain a particular energy demand is derived, and a rotation of modules into rest or charge-recharge cycling mode is carried out. The term charge-recharge cycling mode defines the mode wherein the battery is performing a charging cycle, a charging cycle being the process of charging a rechargeable battery and discharging it as required into a load. By reducing battery charging cycles when a battery is not needed, degradation is reduced and the life of the battery system is extended.

Thus, the battery pack capacity is made up of multiple modules. At certain times (e.g. seasons and weather patterns) not all modules are required to sustain the energy demand. Recharging cycles can then be abated by using less battery modules at that time. Cycle interleaving rotates the modules into rest or into recharge cycles.

In this way, the modules that are used can remain at an "ideal" state of charge ("SoC").

The battery module is controlled based on a predicted expected energy balance between supply and demand, with the aim of preventing unnecessary charge/discharge cycles. The system can rotate modules intelligently into charging, discharging or idle mode to facilitate equal aging.

The controller can be adapted to operate based on energy supply and demand data over a time period of at least a full year. This means that seasonal weather as well as daily insolation times can be taken into account.

The modules used to supply electrical power to the load and the modules to be recharged can be selected such that over time all modules are subjected to the same number of charge and discharge cycles. This means the lifetime of the different modules is made the same, so that the overall battery lifetime can be prolonged as much as possible.

The modules (and number thereof) used to supply electrical power to the load can be such that a predetermined portion of the capacity of the selected modules is used before they are recharged. This enables an efficient way to use the charge storage capacity of the battery modules.

Other approaches can be used, and the battery recharge operation can be tailored to the particular type of battery technology used.

The number of modules used to supply the load can be fixed for a period of multiple days at a time, for example at least two weeks or even monthly.

The invention also provides a solar powered system, comprising:
 a solar cell;
 a modular battery comprising a set of battery modules which are configurable such that a desired combination of modules can be used to provide electrical power to a load; and
 a controller of the invention for controlling the battery module configuration and the recharging of battery modules. This recharging can use the solar cell output.

The modular battery can for example comprise a lithium ion battery.

The battery is dimensioned based on the peak load demand (as is known, for example the shortest day in winter), but a sub-set of the modules can be used when the load demand is below the peak. The modules used are preferably connected so that the same voltage is provided regardless of the number of modules used. They may all be in parallel, or one branch may comprises a set of series modules, and then the number of branches is controlled (again so that the configuration of modules does not change the voltage).

The load can comprise a lighting unit, and the system can then be an off-grid lighting system.

The invention also provides a method of providing a power supply to a load using a system having a solar cell and a battery which comprises a plurality of modules.

The invention also provides a computer program comprising code means which is adapted, when run on a computer, to perform the method of the invention.

BRIEF DESCRIPTION OF THE DRAWINGS

An example of the invention will now be described in detail with reference to the accompanying drawings, in which:

FIG. 9 shows an example of possible battery module control information;

FIG. 10 shows how the control of the invention enables the number of discharge-recharge cycles to be reduced;

DETAILED DESCRIPTION OF THE EMBODIMENTS

The invention provides a power supply system having a solar cell and a battery which comprises a plurality of modules. The number of modules used to supply electrical power to the load is controlled as well as the recharging of the modules, based on energy supply and demand data over a time period of multiple days. This enables the battery modules to be used more efficiently, and they can be charged and recharged less frequently on average, thereby extending the battery lifetime.

The system of the invention makes use of a modular battery system, which enables the battery to configure as a desired combination of modules, so that the battery can have a selectable capacity. The modules can comprise stacked rings.

The battery modules can have a relatively small capacity, as a small granularity avoids large jumps in capacity between the different module configurations. For example, a battery may be formed a number of modules for example in the range 5 to 15, but other configurations are possible.

The invention will be described as applied to an off grid street lighting application (OSL). The particular interest in this application is that the demand varies over the year as a result of the seasonal weather changes as well as sunrise and sunset times.

Figure 1:
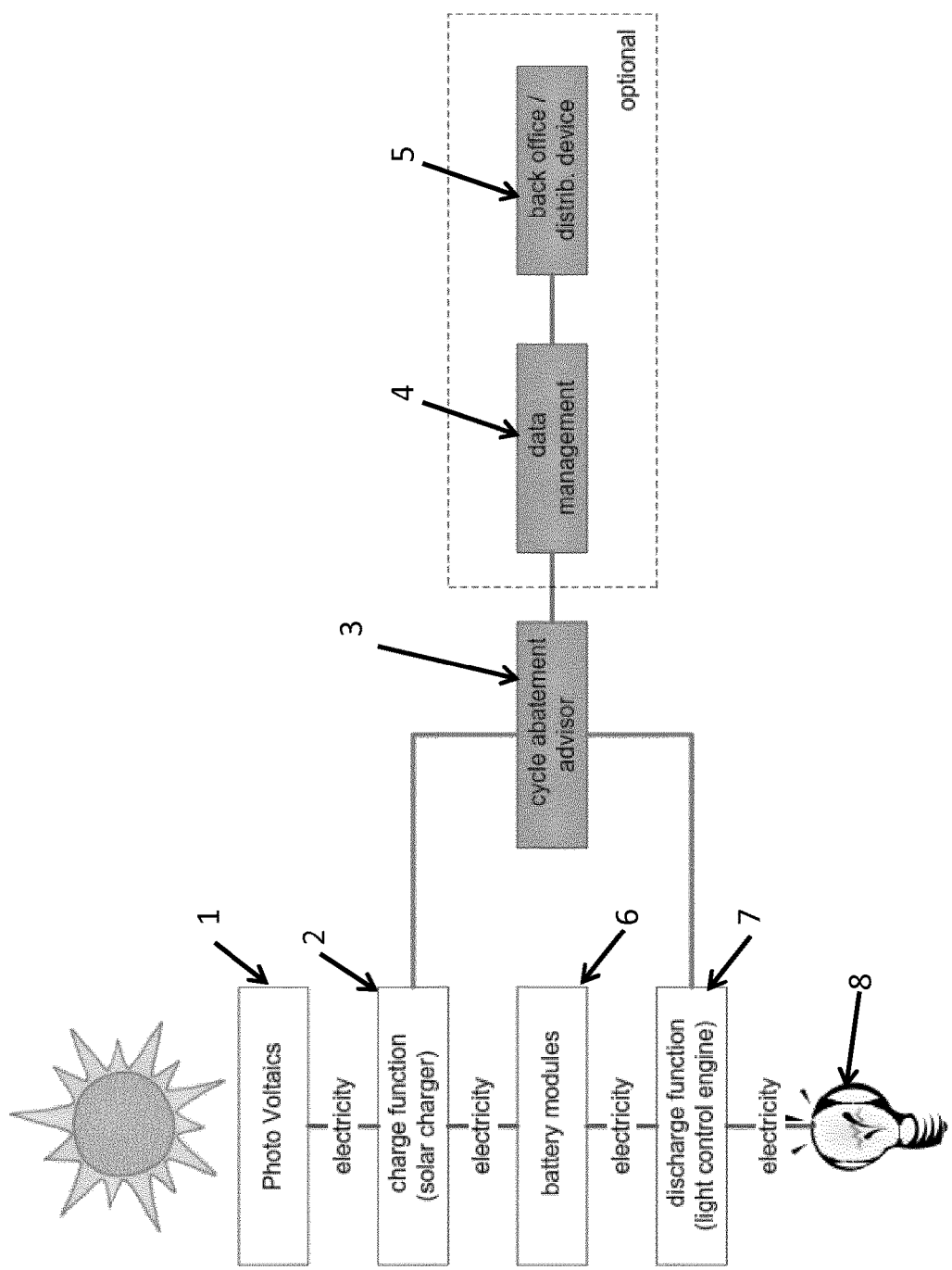
FIG. 1 shows an example of a system in accordance with the invention.

FIG. 1 shows an overview of the system. Some components typical in a battery powered OSL architecture are not shown for sake of clarity.

The system comprises the photovoltaics 1 which provide the generated electricity to a charging system 2. The charging system provides the charge to the battery modules 6, and controls the battery module configuration. The required battery module configuration is determined based on a cycle abatement advisor 3 which determines which battery modules can be taken out of the normal charging function.

The cycle abatement advisor can receive inputs from an optional data management system 4 and back office system 5. The supply of electricity to the load is controlled by a discharge function 7 which is also under the control of the cycle abatement advisor 3 as shown. This provides electricity to the load 8.

To enable the cycle abatement advisor to specify the battery module configuration, the system provides modeling of the power supply to the solar cells essentially used for battery recharging, as well as modeling the demand required for providing lighting.

A power supply map is integrated into the system architecture, plotting the available power supply versus time, in particular over a full year period. To create a power supply map, there is recording of the energy production from the PV panels over time (as is known). This information (e.g. I, V, T-ambient, T-panel) is passed to a planning module part of a system management unit. The map enables the system to be able to predict the yearly available energy production and identify periods with surplus production for the energy shift from summer to winter.

The power supply map enables determination of the periods during the day, but also the periods in the year, when the energy supply is highest. This yearly cycle is used to determine the required PV capacity, and also the battery capacity.

The power supply map lists the expected future energy supply per day over the whole year (or multiple years).

Figure 2:
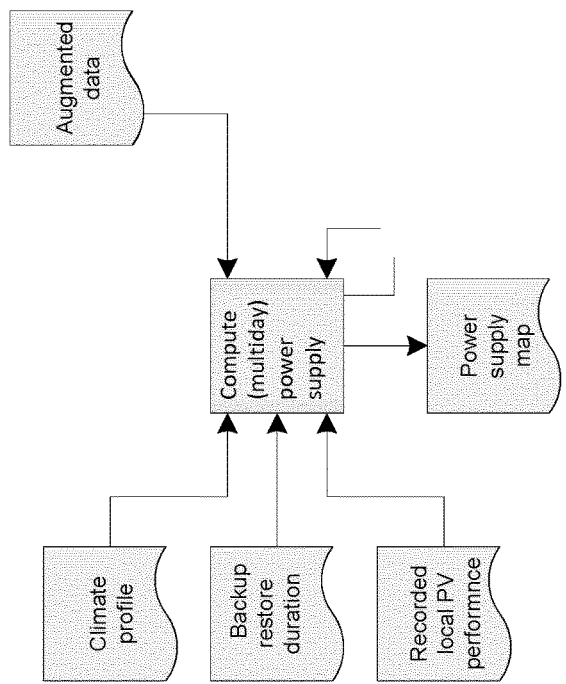
FIG. 2 shows a power supply map used within the system.

FIG. 2 shows how to generate such a power supply map and shows the inputs to enable the computation.

A simple power supply map is created from readily available "insolation" information. This is provided as a "climate profile".

Databases can be used with recorded data such as for example but not limited to:

average daily temperature & daytime temperature (influencing voltage performance in PV modules).

irradiance (influencing current performance in PV modules).

solar average (in Wh/m2/day) or standard test condition ("STC") sun hours.

statistical averages over longer periods.

This data is used to create a power supply map over (more than) the whole year.

The power supply map is augmented by additional data. The system management will implement refinement algorithms to improve the yearly (PV) power supply map, resulting in an adaptive Total Solar Resource Factor ("TSRF") of the local site that can vary over the year(s), but will results in a strategy how maximum energy can be harvested over the whole year. Examples are for example but not limited to:

the required period in e.g. day cycles to restore the backup capacity. This is the "backup restore duration" information shown. The installed backup capacity may be adaptable, but must be restored when it was used/depleted during multiple days of bad weather. The restoration will require additional PV capacity.

local Line Of Sight obstructions from local vegetation such as e.g. forestry. This data may be integrated into or uploaded to the system (for example growth tables of certain vegetation types). In addition, a sensor may record growth of forestry (for example via pictures or detection of Line Of Sight obstruction) and predict reduction of TSRF (i.e. future progression in solar obstruction). This information can be used in the surplus balance map to refine the planned energy production by taking into account what periods in the year will produce enough energy. This information may be communicated to off-board systems to plan e.g. vegetation maintenance or for other maintenance tasks such as e.g. a refill operation or some different operations.

statistic averaging of locally recorded bad weather phenomena such as snow or clouds, leading to less PV power. This improves predictions after the first year. Alternatively this information may be augmented via data download over e.g. memory storage or data communication networks.

local Line Of Sight obstructions from e.g. buildings, mountains, hills, etc.

linked Turbidity data.

local average daily and daytime temperatures, potentially increasing or reducing PV performance.

past and recorded PV performance (I, V, T-ambient, T-panel). This is shown as "recorded local PV performance".

As shown, all of this information is combined to enable computation of the yearly power supply and to provide a power supply map. The list of possible data to be used as outlined above (other than the climate profile, backup restore capacity and recorded PV performance) is shown as "Augmented data".

In addition to modeling the power supply (i.e. how much energy is expected to be available throughout the year) there is also power demand planning management (i.e. how much energy will be needed). This can include taking account of light & dimming profiles.

A power demand map of the year is created, so as to be able to plan the amount of energy that needs to be stored for the energy shift from e.g. summer to winter. This power demand map comprises basic information about geographically computed hours of light and dark, combined with the light and dimming information, and computes information such as (but not limited to) average load/day to plan the energy production and energy storage management.

With the power demand map the system can improve predictions in what month or season the system would need to increase energy production or alternatively execute a different power demand profile on e.g. lower (or higher) load to help manage the energy storage and avoid depletion.

Figure 3:
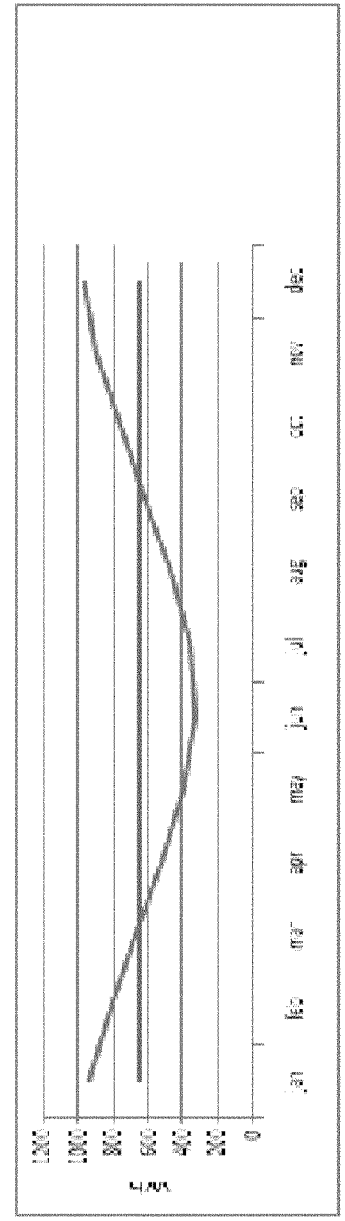
FIG. 3 shows how the required power supply varies during the course of a year.

An example of a power demand map for Eindhoven is shown in FIG. 3. The light load per day is plotted as well as the average over a year. The curved plot is the required energy per month and the straight line is the average.

The power demand map lists the expected future energy demand per day over the whole year or longer.

Figure 4:
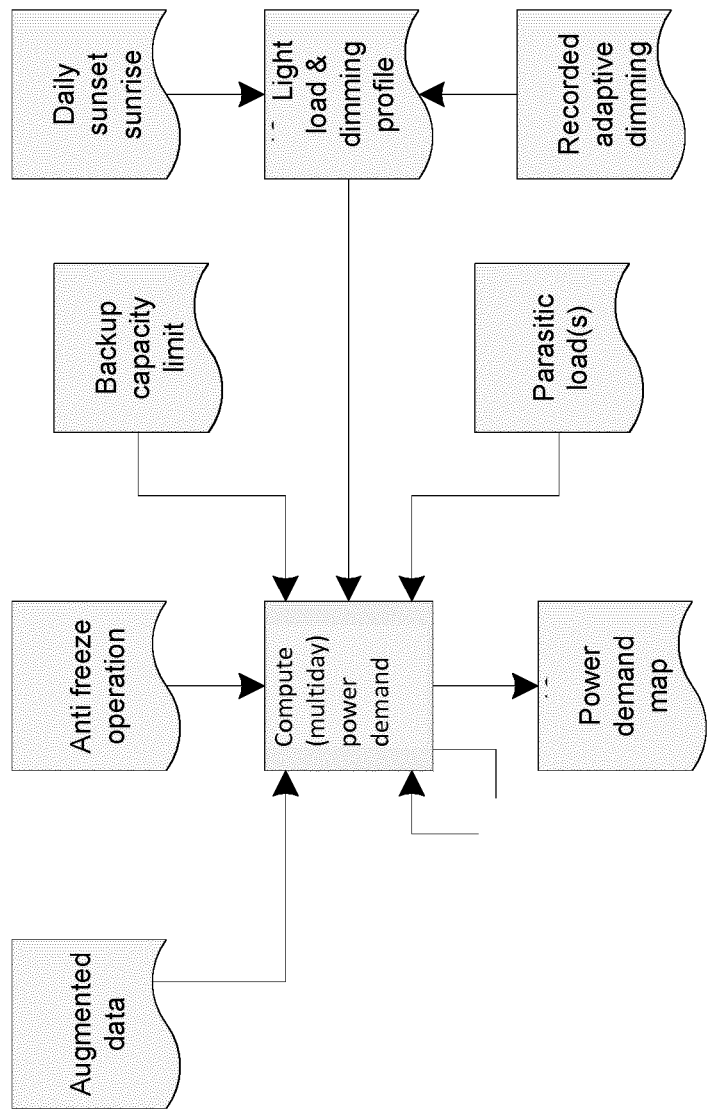
FIG. 4 shows a power demand map used within the system.

An example of how to create the power demand map is shown in FIG. 4, which shows the inputs to enable the computation.

A simple power demand map is created based on the day and night time data of the local site using readily available geographic information (shown as "daily sunrise sunset"). Other sources are available, such as geographical tables and formulas from marine/aerial navigation of celestial navigation.

This data is used to create a darkness overview over the whole year. The resultant hours of darkness are incorporated into a light profile. The light profile may implement many reasons to offset the time of sunset or sunrise, to accommodate for e.g. darker conditions due to bad weather, legislation, energy conservation or other reasons. In addition, dimming during darkness may be included.

Thus, the "recorded adaptive dimming" is taken into account, since this will alter the power demand profile, as well as the anticipated dimming profile, (shown as "light load & dimming profile").

The data is augmented using the same additional data as discussed above ("augmented data"), for example relating to local phenomena such as for example mountain ranges, buildings, forestry, etc. which may lead to a TSRF<100%. Many databases have already done so.

The system management also implements refinement algorithms to improve the yearly power demand map. Examples are for example but not limited to:

Statistic averaging of the duration of adaptive dimming (the "recoded adaptive dimming" shown), leading to longer periods of the light being turned on. This improves predictions after the first days/weeks/months of use as this depends on the local adaptive dimming, which is subject to local traffic in the vicinity of the installed pole. Alternatively this information may be augmented via data download over e.g. memory storage or data communication networks.

Statistic averaging of locally recorded bad weather phenomena's such as e.g. snow or clouds, leading to longer periods of the light being turned on. This progressively improves predictions, especially after the first whole year. Alternatively this information may be augmented via data download over e.g. memory storage or data communication networks.

Parasitic loads of other system components that need to consume electrical energy (shown as "parasitic load(s)"). The data may be dynamic, coming from e.g. measuring alternating loads, which may be locally recorded. This data could also be defined by static budgets or a combination of both.

Applicable values for the (configurable) backup capacity limit (shown as "backup capacity limit").

Anti-freeze operation, which dictates the required additional energy for round the clock heat production to prevent freezing of components of the system. This is shown as "anti freeze operation". The required additional energy may be defined as the number of days where temperatures are below zero, in combination with data from thermal design modeling. Alternatively the data may be augmented by local recordings of temperatures and additional energy use.

The system plans energy storage over a whole year (or more) and this involves decisions about PV size and battery storage size as well as advanced planning modules to avoid depletion of the energy storage. This energy storage management module can plan that energy demand and supply to be matched over the whole year or more and create a running energy surplus balance, that is to be updated continuously.

Figure 5:
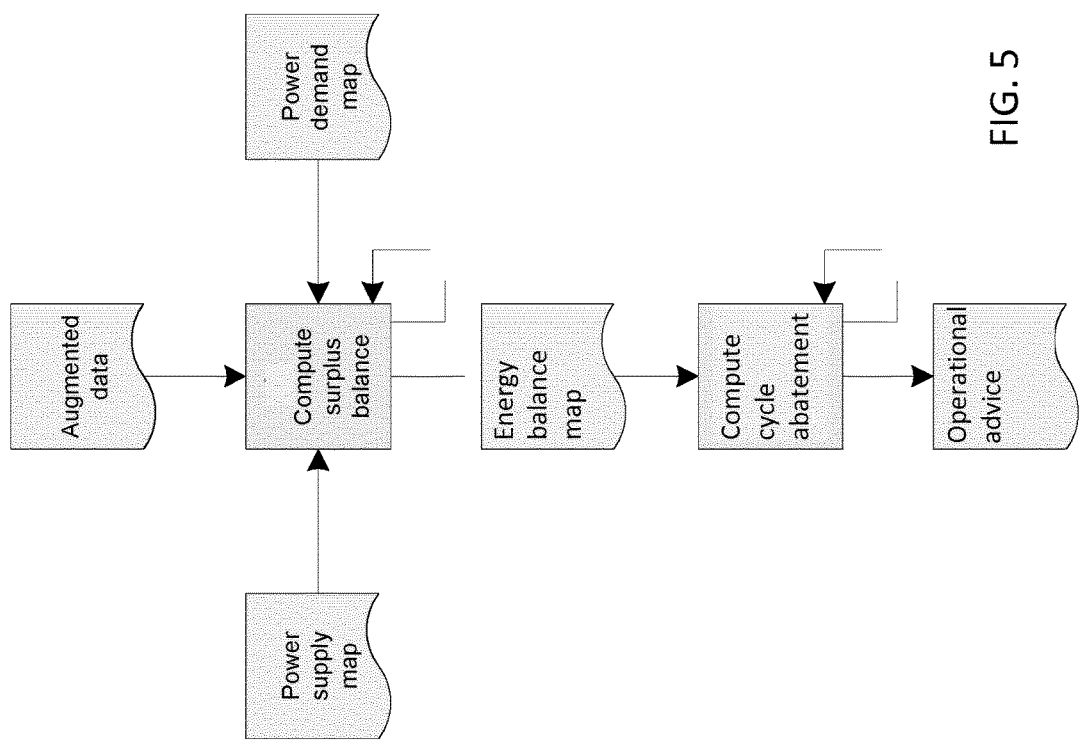
FIG. 5 shows how the battery module is controlled in the system based on an energy balance map.

FIG. 5 shows how the energy balance map is used.

To compute the energy balance, the power supply map and power demand map are used. These are processed together with augmented data which is specific to the site in question, to derive the required PV size. Again this is the "augmented data" discussed above.

The calculation of required PV size based on this type of information is known, and can involve the following steps:

The total energy value of a power demand map is derived;

The system energy efficiency (which is EnEff Energy Storage*EnEff PV) is calculated and the Total Solar Resource Factor (which is the energy efficiency of the local site) is obtained;

The daily required energy (power demand*EnEff system*TRSL) is calculated. The peak sun hours under Standard Test Conditions ("STC") are obtained and the PV array size for the daily load is computed;

A backup capacity is defined in days (the additional night cycles) and the total required energy for the current day plus additional backup days is obtained. A backup restore duration is defined in days and a corrected daily required energy (current day plus part to restore backup) is calculated; and The PV array size to support the corrected daily required energy (current day plus part to restore backup) is calculated and the associated cost of the PV array is derived.

This approach can be taken further, and the daily numbers are added up to months and the months to a year (i.e. a running period of 12 or more months). The result is the average over the year.

An energy balance Fig. compares energy input (i.e. the power supply map) and energy output (i.e. the power demand map). Negative values show an energy deficit and the required energy has to come from energy storage. Positive values show an energy surplus above the daily required load which may be (partially) stored.

The energy balance map is computed. This energy balance map is then used to calculate a cycle abatement schedule which is used to control the system, in particular the configuration of the battery modules.

Thus, at any moment in the year the energy supply and energy demand is computed, so that an energy balance can be derived. In summer there may be a surplus energy supply. In particular, the photovoltaics are dimensioned for winter, and are thus over dimensioned for the summer. Summer nights are shorter than winter nights, so the summer demand is also lower.

The required energy from the battery and the installed energy storage capacity are compared and expressed as percentage used of the installed capacity. Due to the seasonal asymmetry of energy supply and demand, a relatively small part of the installed energy storage may be used during the summer.

Figure 6:
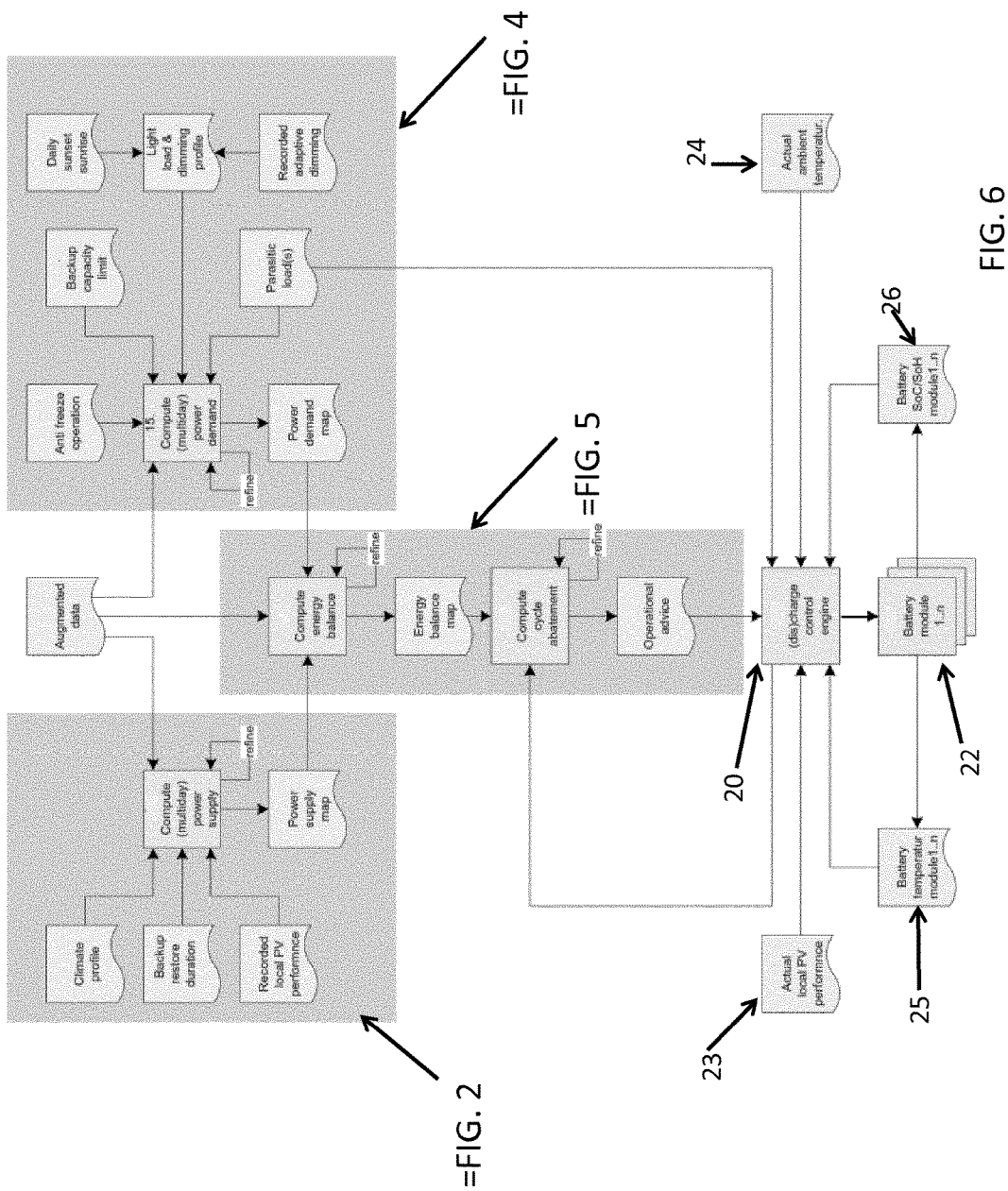
FIG. 6 shows the overall system of the invention in the form of a flow diagram.

FIG. 6 provides an overview of the complete system in the form of a flow chart.

As shown, the overall system combines the power supply map calculation of FIG. 2, the power demand map calculation of FIG. 4 and the energy balance map calculation of FIG. 5.

All of these processes can be improved by "augmented data", which is shown as a single data source for all three.

The operational advice derived from the energy balance map is supplied to a charge and discharge control engine 20, which in turn controls the configuration of the modular battery pack 22. The control engine 20 receives information about the PV performance as shown by input 23 as well as the ambient temperature as shown by input 24. It also receives monitoring information about the battery modules, including the temperature of the modules as shown by input 25 and the state of charge and/or state of health of the modules as shown by input 26, or other battery performance information.

Figure 7:
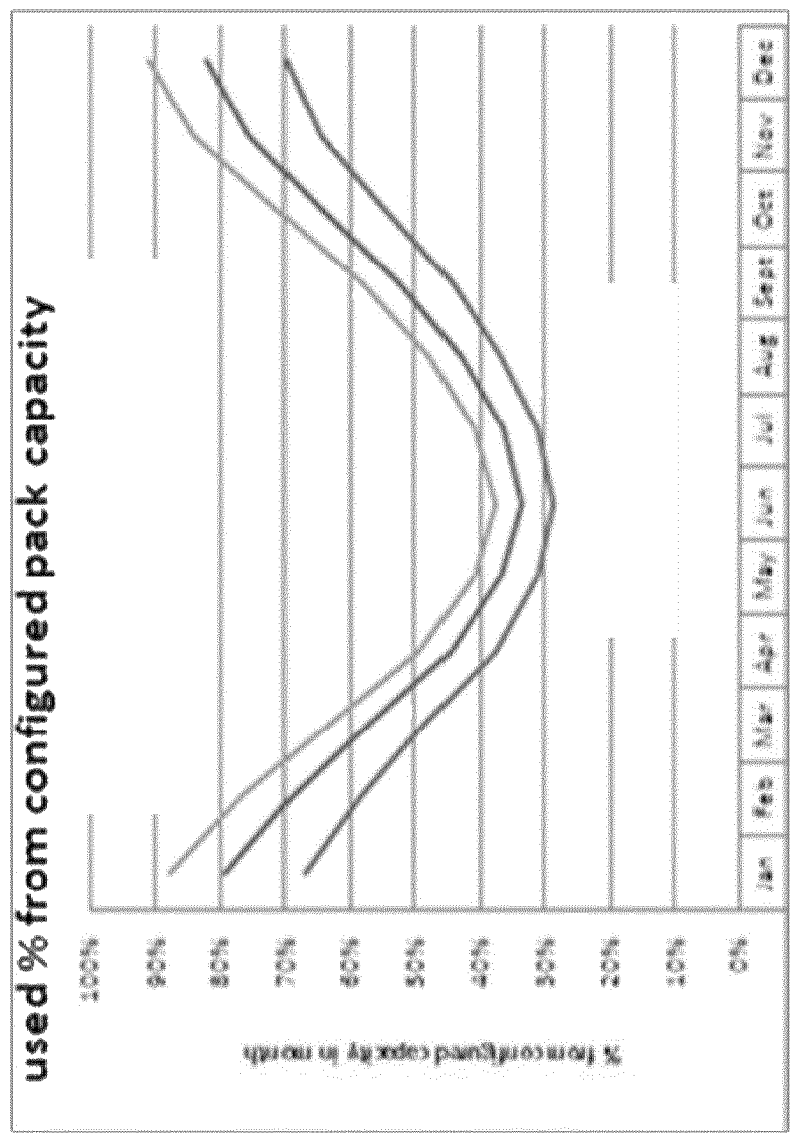
FIG. 7 shows how battery usage varies over time in a conventional system for some different electrical loads.

FIG. 7 shows the seasonal energy usage (for example as shown in FIG. 3) expressed as a percentage of the installed battery capacity under normal charging. The graph shows a degradation range of the battery capacity. It is shows that with increasing degradation of the battery (modules) the system is forced to use more of the remaining capacity to match the daily load.

The three lines indicate battery cycling performance at Beginning Of Life (bottom plot), Middle Of Life (middle plot) e.g. after 300 cycles and End Of Life (top plot) e.g. after 1000 cycles. After increasing cycles, an increasing amount of the capacity is used. FIG. 7 also shows that a relatively small part of the installed energy storage may be used during the summer.

It is well known from present battery literature that batteries can last longer if they are not cycled (i.e. discharged) very deeply. Even better for battery life is to not cycle the battery at all.

Examples of the invention are based on dividing the battery energy storage into separate modules and an intelligent control system will not cycle the battery modules in the battery energy storage when they are not needed.

To facilitate an even degradation, the control system is used to evenly rotate battery modules into cycling or rest. The decision of which and how many modules are to be used is based on a predictive approach which is takes into account the energy supply and energy demand and remaining battery performance based on e.g. state of charge and state of health. By cycling the modules, the end result is that all modules over time can be controlled to subjected to the same number of charging and discharging cycles.

To prevent that the battery modules are not completely recharged during a sequence of days with bad weather, the control system may define a lower threshold of available energy.

To limit degradation from high SoC and high temperature, conditions which may occur in a street lighting pole during summer, the control system can proactively predict the energy supply and opt to recharge depleted modules up to a low level SoC before rotating these modules into rest and out of the cycling. So even if there is a summer energy surplus to recharge the complete battery, this is deliberately not done for the modules that are rotated out of cycling and into rest. This approach of partly recharging idle modules in summer limits degradation.

Figure 8:
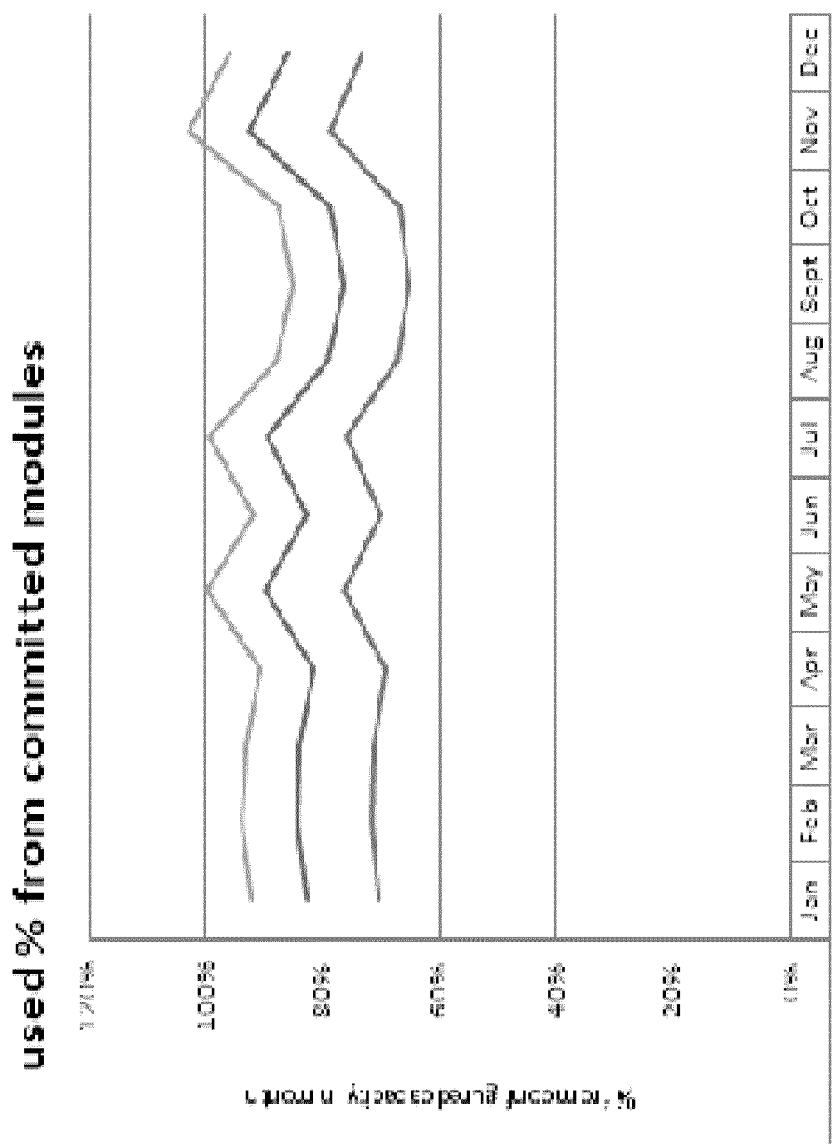
FIG. 8 shows how battery usage varies over time in a system controlled in accordance with the invention.

FIG. 8 shows the seasonal usage as a percentage of the used battery capacity when using the approach of one embodiment. As shown, the control system dynamically adapts the required energy from storage based on seasonal and weather influence. In this example, the battery modules are configured so that those which are being used have at least 60% of their "configured capacity" used.

This "configured capacity" is the capacity used from the available capacity. So if the available capacity is say 2900 mAh per cell, the configured capacity is the part of that nominal, available capacity at the Depth Of Discharge limit. For example, if system has to be operated at 50% depth of discharge to achieve say 3000 cycles, then the configured capacity is 2.9 Ah*0.5=1.45 Ah. If the module has 28 cells, the battery ring module has a capacity of 28*1.45 Ah=40.6 Ah. Based on 3.7 V Lithium Ion, this corresponds to 40.6 Ah*3.7V=150 Wh.

As in FIG. 7, the three lines show different ranges of degradation, with the Beginning Of Life as the bottom plot, the Middle Of Life as the middle plot and the End Of Life as the top plot.

Depending on the cycle life that can be achieved by the selected battery cell, the cycle abatement adds additional "life".

The main feature is the cycle abatement decision, which is based on how many battery modules are needed for given load conditions at a particular time. This information is used to derive a module cycling schedule.

FIG. 9 shows an example of the number of modules that is needed in each month for several loads. This shows 9 different examples of battery system with 3 to 11 modules (rings). FIG. 9 shows the maximum power which can be delivered by the different systems, and shows how the number of rings can be controlled over time for each system.

Thus, this example has a time period of a month over which the number of battery modules in charge-recharge mode is fixed and the remaining modules are at rest. The time period is a number of days but it may be shorter than a month. For example the time period may be between 1 week and 6 weeks, or for example between 2 weeks and 5 weeks.

FIG. 10 shows the resulting number of charge/discharge cycles per individual module for the control approach shown in FIG. 9. The number of cycles is lower than the number of day/night cycles in a month, so that the amount of battery cycling is reduced.

The cycle abatement controller computes a cycle abatement schedule for the charge and charge control engine. This may be based on the total hours of charge and discharge, and/or the amount of charge flow during charging and discharging for every module or other charge methods.

It may be verified whether or not the requested cycle abatement schedule is possible based on additional considerations, such as for example (but not limited to) a configurable duration in days/hours of additional runtime which the system is required to be able to provide, and a risk assessment which may be fixed or dynamically updated, for example in relation to recorded weather events.

Figure 11:
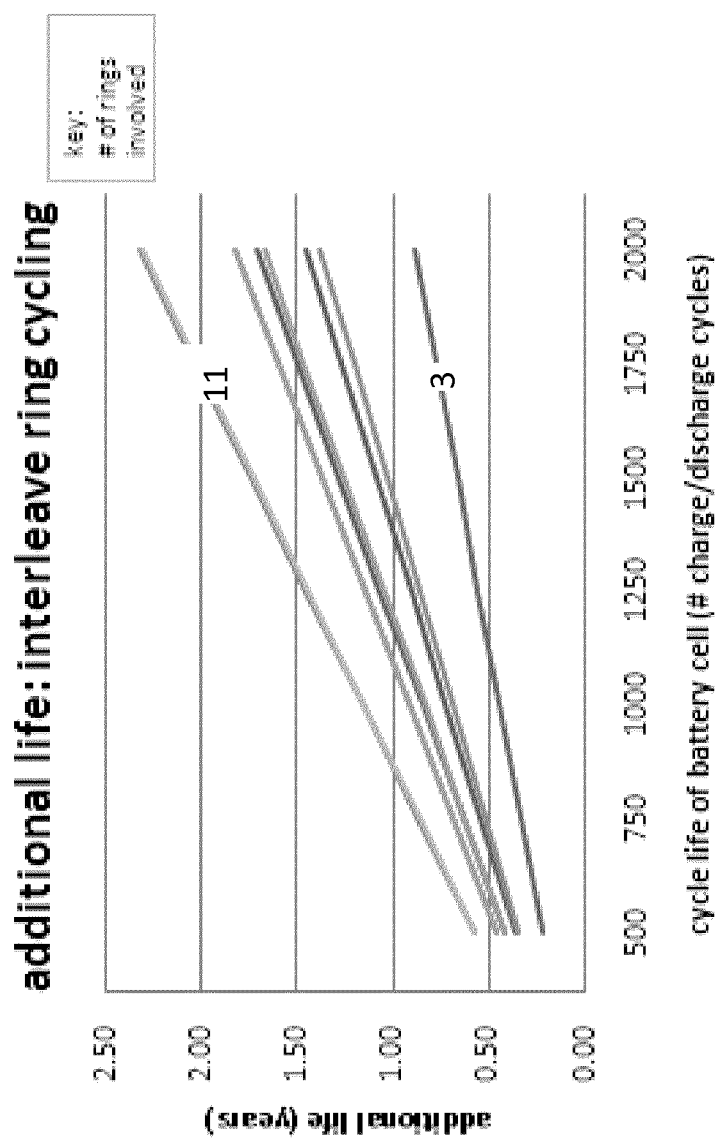
FIG. 11 shows the consequent extension of the lifetime of the system based on the permitted number of cycles.

FIG. 11 shows the additional life which can be obtained by using the cycle abatement approach of one embodiment.

Each line in FIG. 11 represents a different number of battery rings/modules that make up the battery pack for the use cases of FIGS. 9 and 10. There is a different line for 3 rings/modules through to 11 rings/modules required for the battery pack to cover the load. Since a larger load requires more modules (assuming identical module capacities), the cycle abatement will enable the control system to rotate more modules into and out of cycling, bringing a larger benefit of additional life.

The x axis shows an assumed life that the battery cells can achieve. The y axis shows the additional life that the system can then achieve above the basic case of normal cycling during every night without cycle abatement.

In general, the more modules, the more additional life can be obtained, as is clear from the two labeled plots—one for a system with 3 modules and one for a system with 11 modules. The plots are not evenly distributed, because jumps in capacity are caused by sometimes having to add additional modules to cover the load.

Figure 12:
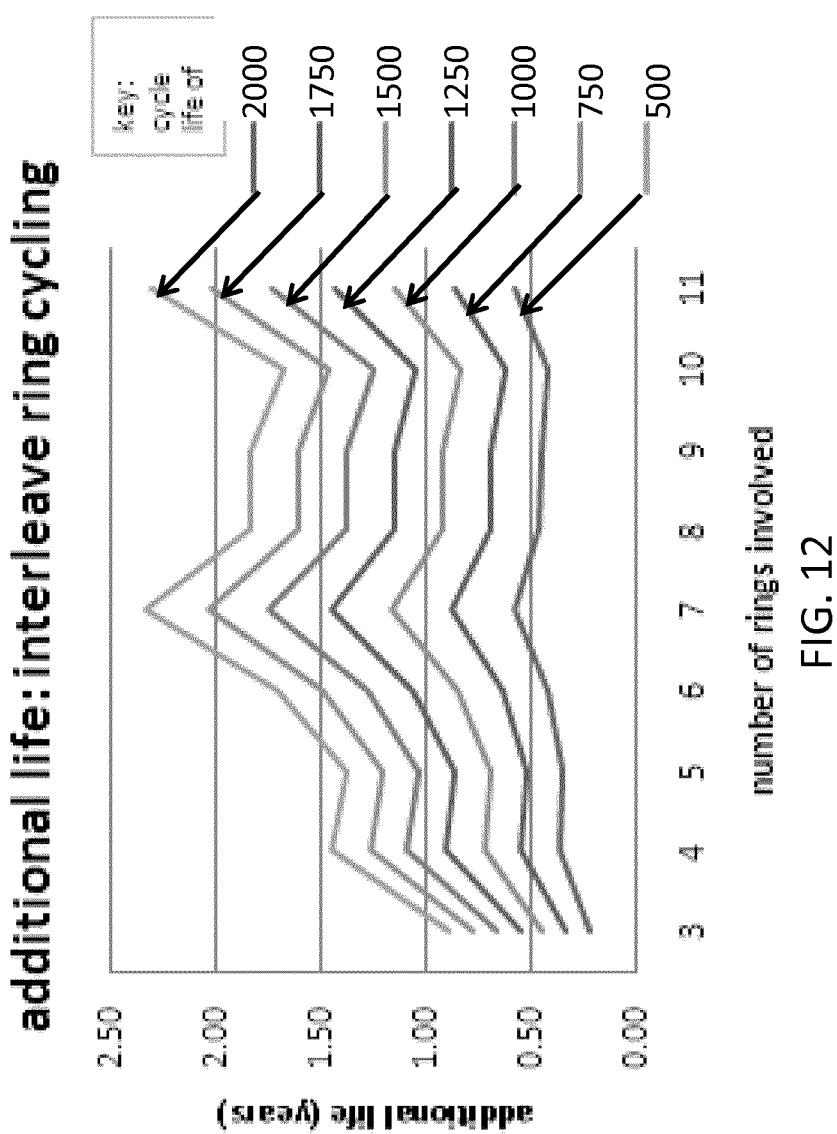
FIG. 12 shows the consequent extension of the lifetime of the system based on the number of battery modules.

FIG. 12 shows the additional life in years which can be achieved by using the cycle abatement based on the number of battery modules in the system (the jumps in this example are because granularity), and for systems with different lifetimes, represented by the number of cycles. Thus, FIG. 12 shows 7 different systems, with lifetimes between 500 cycles and 2000 cycles, and shows how additional years of service can be obtained by using the cycle abatement approach In FIG. 12, it can be seen that 7 modules seems better than 8,9 or 10. This is caused by the fact that by coincidence the load requirement for the 7 modules fits the system very well: on this load the system uses all of the configured storage capacity. In all other cases with different number of modules, the system is somewhat over dimensioned with the minimal number of required modules. In other system configurations, with other ring/modules sizes, 7 modules will be the best system. Thus, the general trend is present that more modules gives greater life extension, but the discrete nature of the components (including the load) means that the plots are not straight lines.

Figure 13:
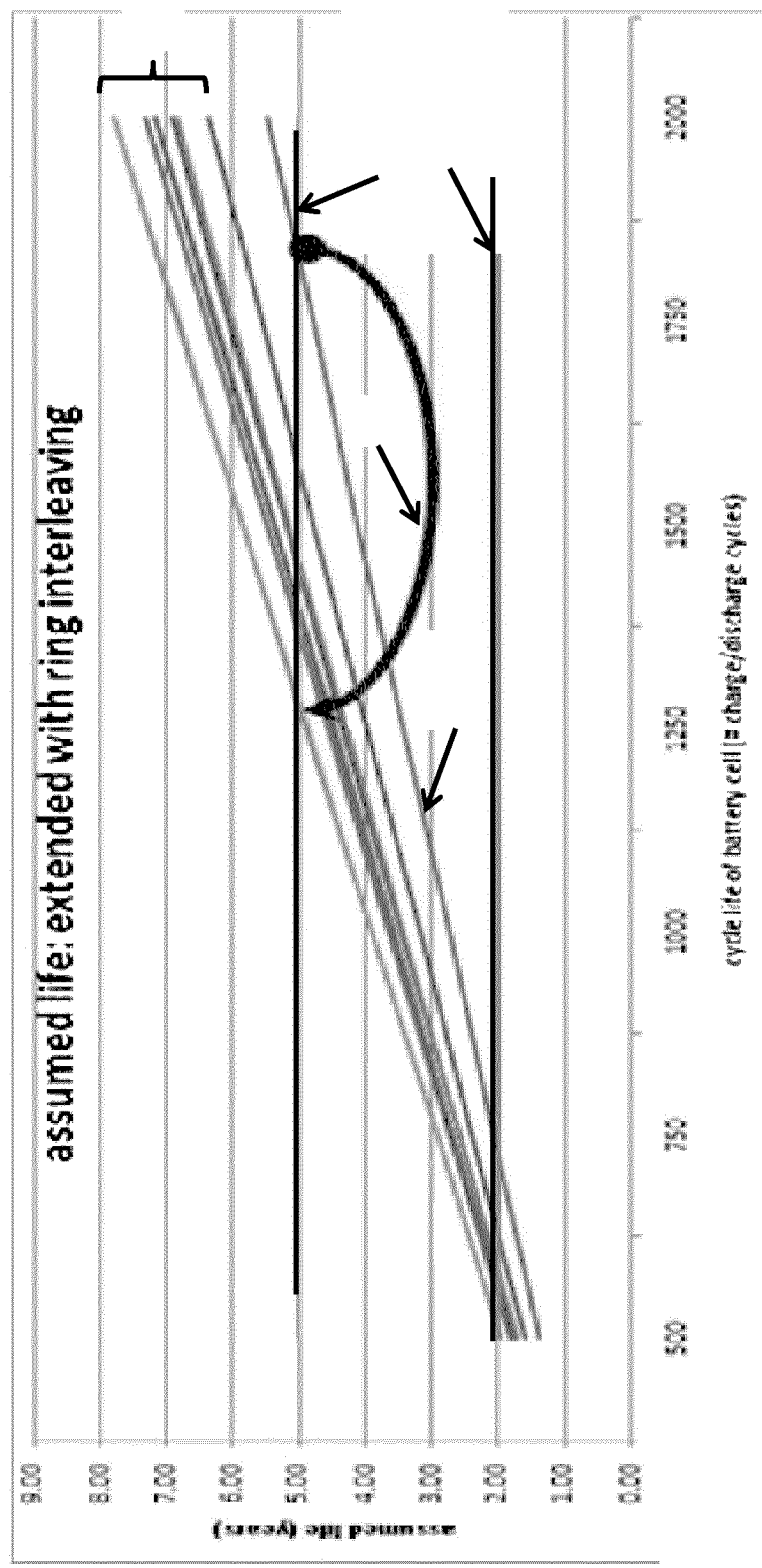
FIG. 13 shows how the system of the invention enables a required lifespan to be achieved with battery modules than are designed for a smaller number of charge-recharge cycles.

FIG. 13 shows the additional life obtained by using the approach of an embodiment for a system aiming to achieve a 5 year lifespan. Plot 30 shows the minimum life of 2 years, and plot 32 shows the desired 5 year lifespan. Plot 34 shows the lifespan for a conventional system as a function of the number of charge and discharge cycles the batteries are able to operate.

The plots 36 show how the lifespan can be improved based on dividing the battery into a number of modules (3 to 11) and providing the modular control as described above.

FIG. 13 shows a benefit of embodiments, in that the target 5 year lifespan can be achieved with battery modules which have a lower number of charge and discharge cycles. This improvement is represented by arrow 38. In this way, a less capable, and therefore lower cost, battery cell can be used to achieve a particular required product life. Alternatively, the battery cells in the energy modules could be used with some more Depth Of Discharge, which results in less over dimensioning and reduction of required battery modules and/or reduction of system cost.

The additional product life can be achieved without the usual battery over dimensioning, meaning at no additional cost.

The cycle abatement approach provides longer life, lengthening the intervals between pole installation, pole removal, maintenance, battery removal/replacement. The battery performance in hot conditions can also be improved. During summer, when there is an energy surplus to recharge the complete battery, the system will not completely recharge those modules that are identified to be idle during the next day-night cycle. These cells can be only partially recharged up to a low SoC level, linked to prediction of energy supply and demand. During summer, when temperatures in a lighting pole can be hot, the control system may opt to avoid charging a battery module uninterrupted until it is full, but may intermittently charge after it has cooled down a bit. This module balancing will be linked to the prediction of energy supply and demand.

Battery derating can be reduced. Instead of over dimensioning the battery to cope with degradation, the intelligent abatement of cycles can provide the additional life at no additional cost.

The result of the use of the system is that some battery modules will not receive charge when sun is shining and the solar charger provides a charge current, and the State of Charge of the battery modules will not be identical.

The invention has been described above in connection with an off grid lighting system. For this application, the invention enables high quality street lighting with 100% availability and long life. There is a special market for isolated light points, e.g. those that require high investment to install. It will be appreciated that embodiments other than street light are possible.

For horticultural application, a pole is inserted in the ground and can provide assimilation lighting to crops in particular seasons in the year. This offers safety, freedom of placement, and low initial cost of installation.

Hybrid street lighting applications are also possible. The system provides a shift in demand by storing excess electricity from the grid at cheap prices and operating street lighting always at low cost. There are other possible markets for medical applications—to provide a post-disaster power supply, which can be generated from the sun. There are also home energy storage applications.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling a power supply system, wherein the power supply system comprises a solar cell and a battery that includes a plurality of modules, wherein the controller is configured to control electrical power from the battery to a load, wherein the controller is configured to control the modules that supply the electrical power to the load and to control recharging of the modules based on energy supply and load demand data such that some of the modules are in a charge and discharge cycling mode while other of the modules are at rest, and wherein the energy supply and load demand data comprise expected energy supply per day and expected load demand per day calculated over a predetermined time period of multiple days.

2. The controller as claimed in claim 1, wherein the predetermined time period is at least a full year.

3. The controller as claimed in claim 1, wherein the controller is configured to select the modules to be discharged and the modules to be recharged in such a way that over time all of the modules are subjected to about same number of charge and discharge cycles.

4. The controller as claimed in claim 1, wherein the predetermined time period is at least two weeks.

5. The controller as claimed in claim 1, wherein a number of the modules that supply the load is fixed for the predetermined time period.

6. A solar powered system, comprising:
a solar cell;
a battery comprising a plurality of modules which are configurable such that a desired combination of the modules is used to provide electrical power to a load; and
a controller configured to control electrical power from the battery to the load, wherein the controller is configured to control the modules that supply the electrical power to the load and to control recharging of the modules based on energy supply and load demand data such that some of the modules are in a charge and discharge cycling mode while other of the modules are at rest, and wherein the energy supply and load demand data comprise expected energy supply per day and expected load demand per day calculated over a predetermined time period of multiple days.

7. The solar powered system as claimed in claim 6, wherein the source of electricity is an output from the solar cell.

8. The solar powered system as claimed in claim 6, wherein the battery comprises a lithium ion battery.

9. The solar powered system as claimed in claim 6, wherein the battery is dimensioned based on a peak load demand, and the controller is configured to use a sub-set of the modules when a load demand is below the peak load demand.

10. The solar powered system as claimed in claim 6, wherein the load comprises a lighting unit.

11. The solar powered system as claimed in claim 6, wherein a number of the modules that supply the load is fixed for the predetermined time period.

12. A method of providing a power supply to a load using a system having a solar cell and a battery that includes a plurality of modules, the method comprising:
controlling electrical power from the battery to the load by controlling a number of the modules used and controlling recharging of the modules based on energy supply and load demand data such that some of the modules are in a charge and discharge cycling mode while other of the modules are at rest, and wherein the energy supply and load demand data comprise expected energy supply per day and expected load demand per day calculated over a predetermined time period of multiple days.

13. The method as claimed in claim 12, wherein the predetermined time period is at least a full year.

14. The method as claimed in claim 12, further comprising selecting the modules to be discharged and the modules to be recharged in such a way that over time all of the modules are subjected to about same number of charge and discharge cycles.

15. The method as claimed in claim 12, wherein a number of the modules that supply the load is fixed for the predetermined time period.

16. A non-transitory computer-readable medium having one or more executable instructions stored thereon, which when executed by a processor, cause the processor to perform a method for providing a power supply to a load using a system having a solar cell and a battery that includes a plurality of modules, the method comprising:

controlling electrical power from the battery to the load by controlling a number of the modules used and controlling recharging of the modules based on energy supply and load demand data such that some of the modules are in a charge and discharge cycling mode while other of the modules are at rest, and wherein the energy supply and load demand data comprise expected energy supply per day and expected load demand per day calculated over a predetermined time period of multiple days.

17. The non-transitory computer-readable medium as claimed in claim 16, wherein a number of the modules that supply the load is fixed for the predetermined time period.

* * * * *